(12) United States Patent
Galbraith (10) Patent No.: US 9,179,658 B2
(45) Date of Patent: Nov. 10, 2015

(54) FISHING TIP-UP WITH MULTIPLE, SELECTABLE MAGENTIC SENSOR TARGETS

(71) Applicant: John Galbraith, Port Perry (CA)

(72) Inventor: John Galbraith, Port Perry (CA)

(73) Assignee: John Galbraith, Port Perry, Ontario (CA)

(*) Notice: Subject to any disclaimer, the term of this patent is extended or adjusted under 35 U.S.C. 154(b) by 263 days.

(21) Appl. No.: 13/987,726

(22) Filed: Aug. 26, 2013

(65) Prior Publication Data

US 2014/0068995 A1 Mar. 13, 2014

Related U.S. Application Data

(63) Continuation-in-part of application No. 12/926,578, filed on Nov. 29, 2010, now abandoned.

(51) Int. Cl.
*A01K 97/12* (2006.01)
*A01K 97/01* (2006.01)

(52) U.S. Cl.
CPC .................. *A01K 97/12* (2013.01); *A01K 97/01* (2013.01)

(58) Field of Classification Search
CPC ........ A01K 97/01; A01K 97/10; A01K 97/12
USPC .................................................. 43/15, 16, 17
See application file for complete search history.

(56) References Cited

U.S. PATENT DOCUMENTS

| | | | |
|---|---|---|---|
| 3,729,849 A * | 5/1973 | Richard | 43/17 |
| 4,190,977 A | 3/1980 | Casper | |
| 4,642,930 A | 2/1987 | Graf | |
| 4,837,965 A | 6/1989 | True | |
| 5,097,618 A | 3/1992 | Stoffel | |
| 5,551,183 A | 9/1996 | Solem | |
| 5,987,801 A * | 11/1999 | Anderson | 43/17 |
| 6,079,142 A | 6/2000 | Danser | |
| 6,463,691 B1 | 10/2002 | Atkins | |
| 6,594,941 B1 * | 7/2003 | Anderson | 43/17 |
| 6,622,421 B1 | 9/2003 | Daniels | |
| 7,008,086 B1 | 3/2006 | Kell | |
| 7,207,133 B2 | 4/2007 | Schiemann | |
| 2009/0139130 A1 | 6/2009 | Nozzarella | |
| 2011/0277369 A1 * | 11/2011 | Martinella et al. | 43/4.5 |
| 2013/0125445 A1 * | 5/2013 | Schmitt et al. | 43/4.5 |

FOREIGN PATENT DOCUMENTS

CA 2340360 12/2000

* cited by examiner

*Primary Examiner* — Darren W Ark
*Assistant Examiner* — Marc Burgess (57) ABSTRACT

The fishing tip-up has an upright support and a swinging arm pivotally mounted to the top of the support. A forward segment of the arm pivots downward and toward the support when the rear segment pivots upward. The swinging arm is adapted to support a fishing line which extends downward into a fishing hole from the forward segment and to which a bait is attached for attracting a fish. When a fish strikes, the forward segment pivots downward when a force greater than a predetermined value is applied to the fishing line. The predetermined value is adjustable. A magnet is provided in the rear segment of the swinging arm and keeps a reed switch in the support open until a fish strikes. At that time, the rear segment swings up and away from the support with resulting separation of the magnet from the reed switch and concurrent closing of the switch. When the reed switch is closed, a light illuminates.

8 Claims, 10 Drawing Sheets

FISHING TIP-UP WITH MULTIPLE, SELECTABLE MAGENTIC SENSOR TARGETS

CROSS REFERENCE TO RELATED PRIOR APPLICATION

This application is a Continuation-in-Part of application Ser. No. 12/926,576 filed in the United States Patent and Trademark Office on Nov. 26, 2010, now abandoned, which application is incorporated herein by reference in its entirety.

FIELD OF THE INVENTION

This invention relates to fishing tip-ups and more particularly in a fishing tip-up which is electrically and magnetically actuated.

BACKGROUND OF THE INVENTION

Fishermen typically prefer to have a number of Locations in which to fish so that if fish are not striking in one location, the fishermen can move to others until they find one where the fish do strike. If the fishermen are in boats, they have a wide choice of locations while if they are fishing from shore they have a more limited choice, but they can still move if fishing from one location proves fruitless. Ice-fishing however is another matter. Extensive preparations are necessary before an ice fisherman can begin to fish. He must usually erect an enclosure to protect himself from the wind, sleet and snow, he must provide heat in the enclosure if the weather is very cold, he must drill a number of holes in the ice and so on. Once the ice fisherman has completed his preparations, he cannot move without a great deal of inconvenience. He must undo the preparations he has already made at his present location and repeat them at a new location. A great deal of time is required for him to do so and in practice once he has set up at one location he does not move.

To increase the odds of catching fish while ice fishing, fishermen will spread their lines out as far possible to cover a wide area. To do so, they will install an un-manned tip-up outside the enclosure and remain in the enclosure and fish from there while keeping their eye on the tip-up. Ice-fishing is best at dawn and dusk at a time when the light is dim or there is total darkness. At such time, a tip-up is very difficult to see even when it is not more than 10 feet from an enclosure. Blowing snow and fog may also contribute to limited visibility. Lanterns may be used to illuminate the tip-up but they draw heavily from a battery since they must remain on continuously. In cold weather, batteries generally perform poorly and the light from a lantern that remains continuously on becomes dim in a relatively short period of time.

Tip-ups that are commercially available have various means for overcoming this problem. One such tip-up has a pin which is released when the device is activated by a strike. When the pin is released, a siren sounds and lights flash. However the pin can become frozen in cold weather and not release at the time of a strike. Other known tip-ups continuously draw from a battery which soon runs down in cold weather. Still others delay the sounding or displaying of a signal when a fish has struck the bait.

In general, the effectiveness of most of the tip-ups that are commercially available falls off in cold weather when they are exposed to adverse weather conditions. Freezing rain, snow and ice can form around the release points of signals such as flags, sirens and lights and prevent the devices from reacting when there is a strike. On occasion, winds can set off the devices as can small fish which may nibble at the bait and cause the tip-ups to react. Until the devices are re-set, they do not react later when there is a genuine strike.

SUMMARY OF THE INVENTION

I have invented a fishing tip-up that signals a strike by means of a bright light, a siren or other way that is unlikely to be missed. The signal is powered by a battery or other source of energy and only draws from the source when the device is activated. The signal accordingly remains strong over an extended period of time. In addition, no illumination of the tip-up is necessary since a fisherman will see the signal light or hear the siren when the device is activated by a strike. Moreover, my device re-sets itself automatically if it is activated by the wind, by a nibbling fish or otherwise and has provision for adjusting the sensitivity of the device to the weight or the fighting characteristics of a fish being sought.

Briefly the tip-up of my invention comprises: a signal; an upright support and a swinging arm pivotal relative to the support and having forward and rear segments. The forward segment pivots downward and toward the support when the rear segment pivots upward. The swinging arm is adapted to support a fishing line which extends downward into a fishing hole from the forward segment and to which a bait is attached for attracting a fish. In such case, the forward segment pivots downward when a force greater than a predetermined value is applied to the downwardly extending fishing line. A magnetically activated electrical switch activates the signal which is located in one of either the support or the rear segment of the swinging arm. A magnet is provided in the other of the support and the rear segment for activating the switch. The magnet separates from the switch when the rear segment pivots upward and away from the upright

DESCRIPTION OF THE DRAWINGS

The fishing tip-up of the invention is described with reference to the accompanying drawings in which.

Like reference characters refer to like parts throughout the description of the drawings.

DESCRIPTION OF PREFERRED EMBODIMENT

Figure 1:
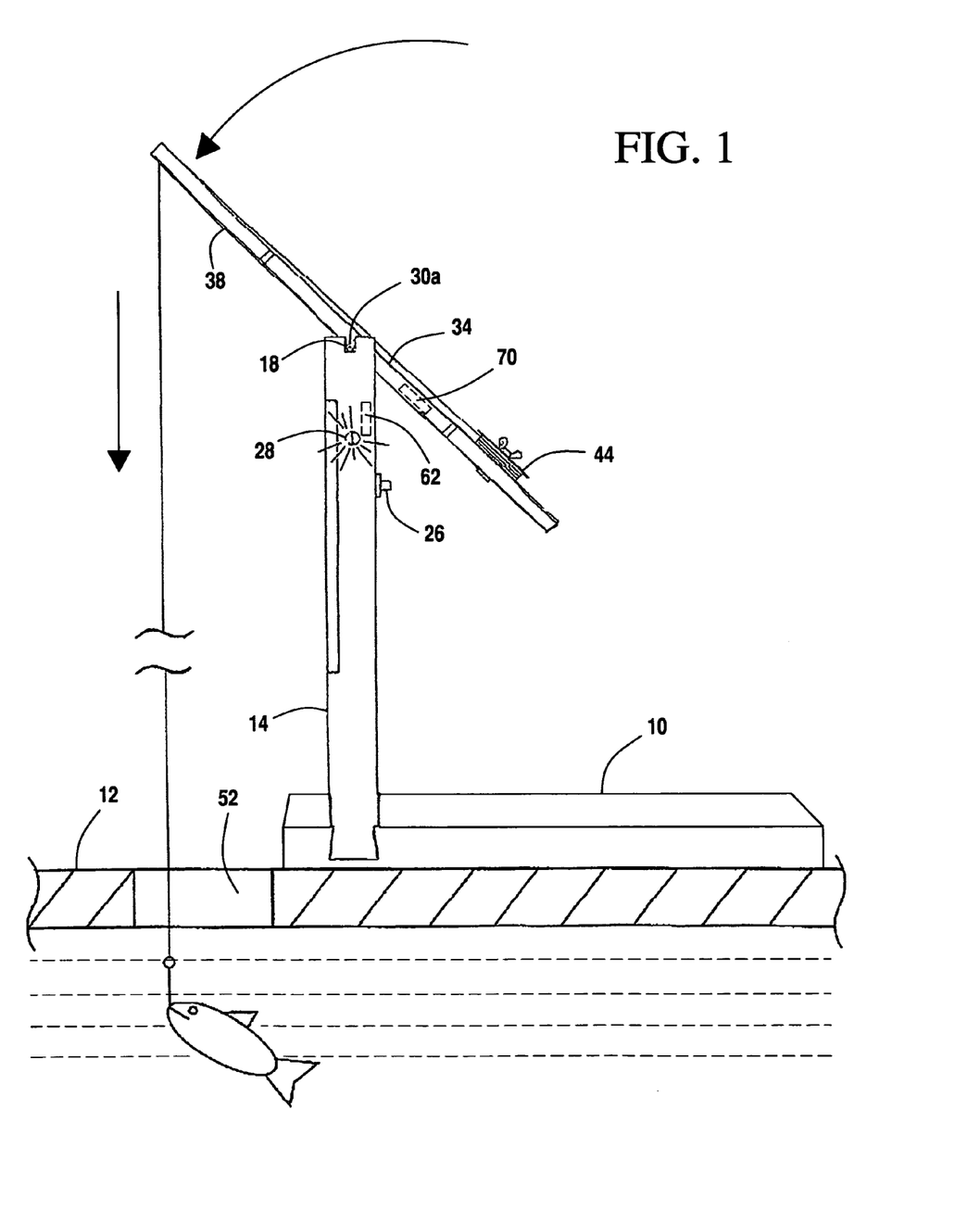
FIG. 1 is a elevation of the tip-up.
Figure 2:
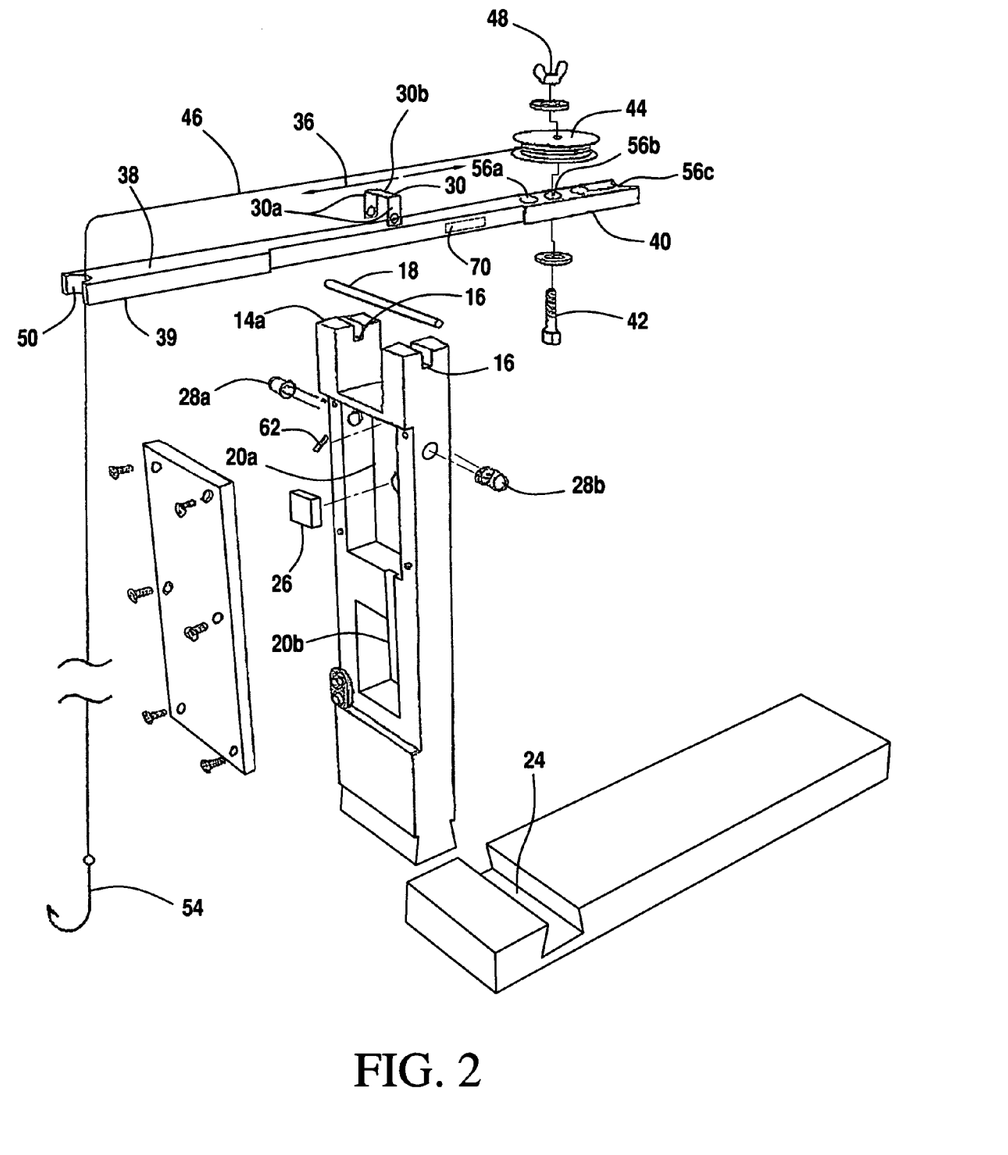
FIG. 2 is an exploded perspective view of the tip-up.

With reference to FIGS. 1 and 2, the fishing tip-up includes a base 10 which, in use, normally rests on a sheet of ice 12 at the surface of a lake or river in below freezing temperatures. An upright support 14 extends upwardly from the support and terminates at an upper wall 14a. The support is removably scoured in a slot 24 in the base so that the support can be removed from the base for compact storage when the tip-up is not in use. There is a pair of notches 16 in the upper wall for receipt of a rod 18.

The upright support is hollow and has a rectangular cross-section for receipt of the electrical components required for the tip-up to function. The components are described below and are received in upper and lower compartments 20a,b, respectively, in the support. The compartments are closed by a plate 22 which can be removed to gain access to the interior of the compartments. An on-off switch 26 is attached to one side of the support and a pair of electric lights 28a, b are attached to the side walls of the upright support.

A U-shaped bracket 30 has flanges 30a provided with openings through which rod 18 extends. The web 30b of the bracket is in contact with the upper wall of a swinging arm 38 and the bracket accordingly connects the swinging arm to rod 18. The connection is slightly loose so that the swinging arm can slide longitudinally under the bracket in either of the directions of two headed arrow 36 when sufficient force is applied to the arm.

Thus rod 18 acts as a pivot point for the swing arm. The position of the rod relative to the arm is adjustable since bracket 30 allows the arm to slide relative to upright support 14

The rod rests in notches 16 in the upper wall of the upright support and serves as a pivot for the swinging arm to oscillate relative to the support. The swinging arm is composed of two segments, a forward segment 39 and a rear segment 40. The two segments are on opposite sides of rod 18. Openings 56a,b and c are spaced along the rear segment for receipt of a screw 42 which serves as a spindle on which a reel 44 revolves. A wing nut 48 secures the screw to the swinging arm. Openings 56a,b and c allow the position of the reel to be adjusted so that weight on the fishing line which cause the swinging arm to tip can be altered.

A fishing line 46 is wound around the reel. A notch 50 is formed in the forward end of the swinging arm, for guiding the line along the arm and downward from the notch. The line extends through an opening 52 in the ice and a hook 54 is attached to its lower end.

Figure 3:
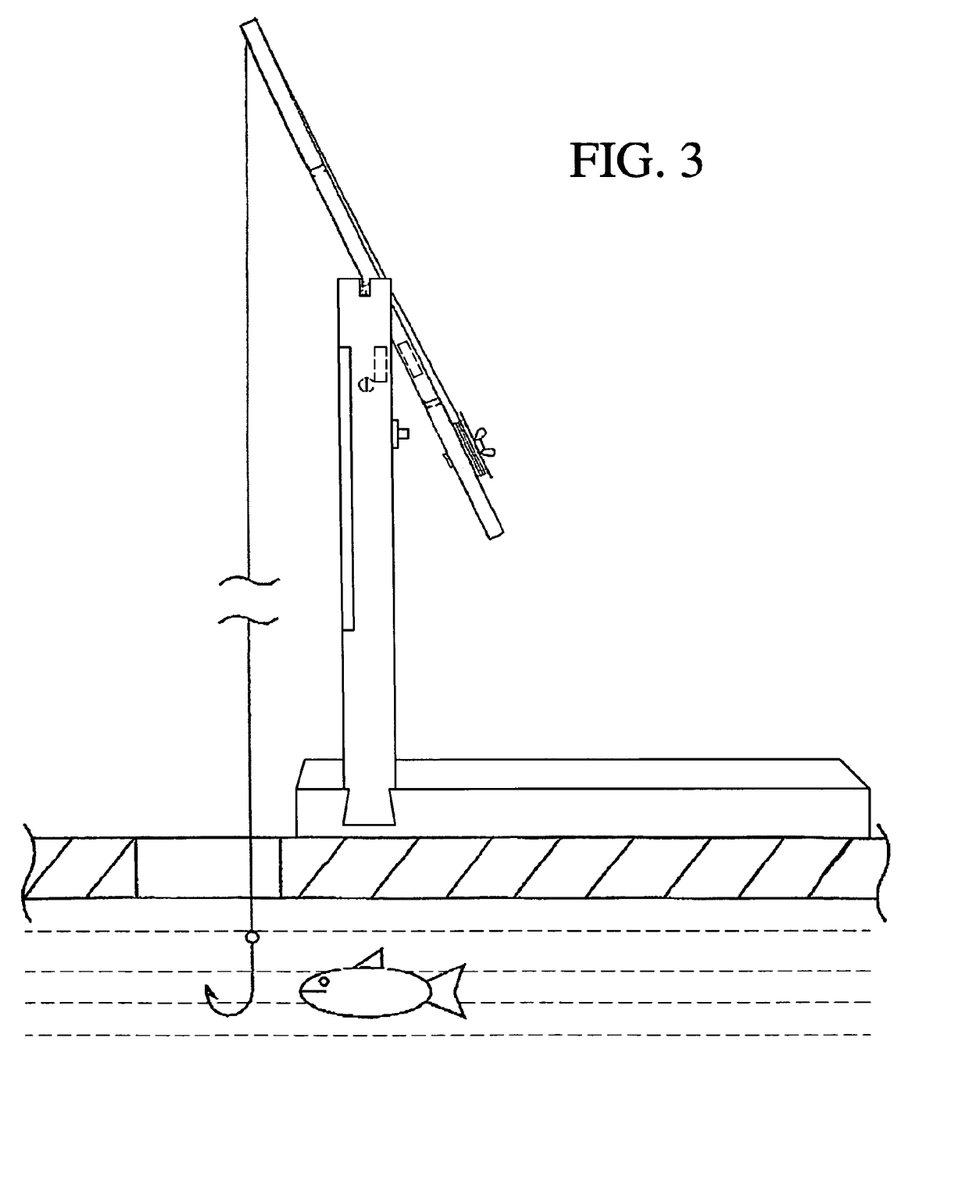
FIG. 3 is an elevation of the tip-up in an armed position.

With reference to FIGS. 1 and 3, the swinging arm is held in a generally vertical or "armed" position as illustrated in FIG. 3 by the weight of the reel or other means until a fish strikes the bait on the hook. When a strike occurs, the weight of the fish or the force applied to the line by a struggling fish causes the forward segment of the arm to tip downward to a so-called "tripped" position. In FIG. 1 the forward segment of the swinging arm is at the beginning of its descent toward the tripped position. The weight or force necessary to cause the forward segment to swing downward can he adjusted by sliding the swinging arm forward or backward under bracket 30 or by adjustment of the position of the reel on the swinging arm as is explained above.

Figure 4:
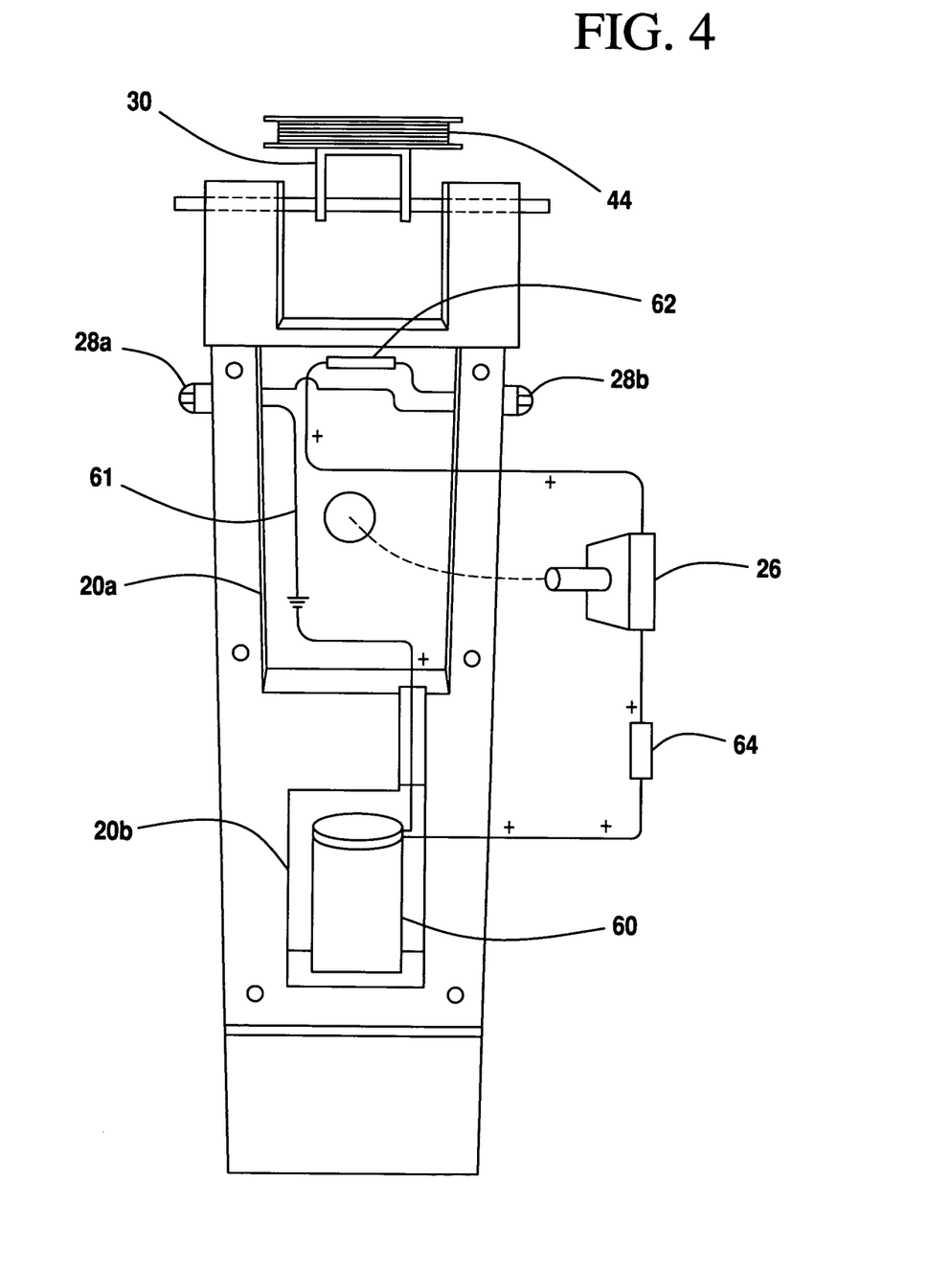
FIG. 4 is side elevation of the tip-up in which normally closed compartments are open to expose the electrical components of the device.

With reference to FIG. 4, mounted in the lower compartment 20b is a battery 60 and in the upper compartment 20a is a closed circuit 61 composed of a normally closed reed switch 62, previously mentioned on-off switch 26, a resistor 64, and lights 28a,b on opposite side walls of the upright support. The circuit is activated by battery 60.

Figure 5:
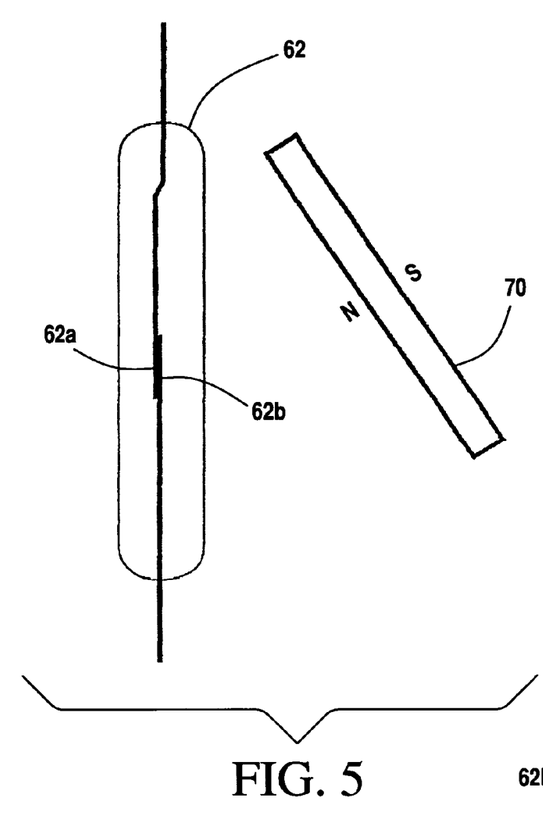
FIGS. 5 and 6 illustrate schematically the switch and magnets which activate the signal.

As illustrated in FIG. 5, the contacts 62a,b of the reed switch are resiliently deformable but in the normal closed position are in contact with each other and circuit 61 is closed, assuming that on-off switch 26 is turned on.

Figure 6:
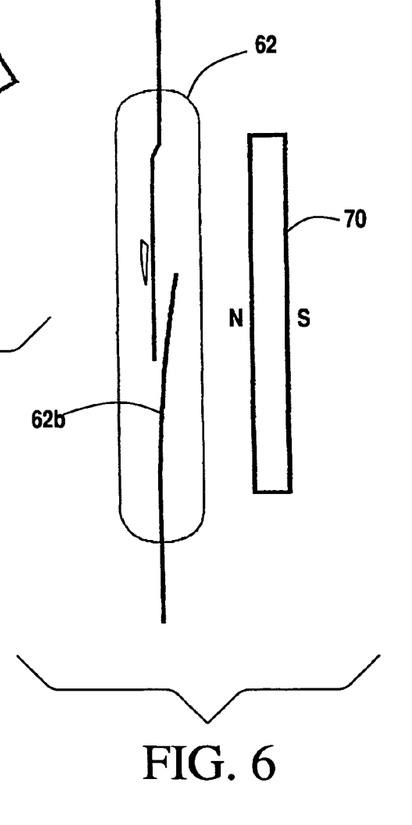

With reference to FIGS. 2, 3, 5 and 6, there is mounted within the rear, segment of the swinging arm a magnet 70 which is adjacent to reed switch 62 when the swinging arm is in the armed position as illustrated in FIG. 3. The magnetic attraction of contact 62b of the reed switch to the magnet causes the contact to swing toward the magnet as illustrated in FIG. 6 and to separate from the other contact 62a of the switch. Circuit 61 is then open and the lights are off.

As the swinging arm swings to the tripped position illustrated in FIG. 1, the magnet separates from the reed switch as illustrated in FIG. 5 and the magnetic attraction which holds contact 62b apart from contact 62a becomes progressively weaker. When the resilient force of the contact overcomes the magnetic attraction, contact 62b returns to its normal position as illustrated in FIG. 5 and circuit 61 doses. Lights 28a,b then illuminate thereby alerting the ice fisherman who operates the fishing tip-up that the swinging arm has tripped.

The sensitivity of the swinging arm to tipping can be adjusted by altering the position of the reel on the swinging arm and the position of the arm under bracket 30. As the reel is moved forward toward the bracket, the rear segment of the swinging arm will rise with resulting increased separation of magnet 70 from reed switch 62 when the tip-up is in an armed position. As a result, less force on the fishing line will be required to tip the swinging arm. Similarly, the further forward the swinging arm is moved under the bracket, the higher the rear segment will be rise in the armed position with resulting increased sensitivity of the tip-up to a pull on the line.

The sensitivity of the swinging arm can be adjusted in other ways and these ways are described in the following paragraphs:

The location of reed switch 62.

When the tip-up is armed and is at rest, the reed switch which is normally closed, is within the magnetic field of magnet 70, and is held open by the magnet as is illustrated in FIG. 6. However as the space increases, the magnetic attraction of the magnet on the reed switch weakens and eventually is too weak to hold the reed switch open. The switch then closes as illustrated in FIG. 5.

While the tip-up is at rest or "armed", the space between the magnet and the reed switch can be altered. The space can be increased or decreased by altering the position of the fulcrum on the swinging arm or by altering the position of the reel on the arm. An adjustment of either will result in a change in the spacing between the reed switch and the magnet. As the space increases, the tip-up becomes more and more sensitive to the weight on the line. If the spacing is such that the magnetic attraction is only just sufficient to hold the reed switch open but no more, the activity of a small fish on the line may be sufficient to slightly increase that spacing and the tip-up will trip. If on the other hand, the reed switch is well within the magnetic field of the magnet, the nibbling of small fish on the line will not cause the tip-up to trip.

The tip-up can accordingly be adjusted to trip when large fish but not small fish bite the bait or it can be adjusted to trip when small fish nibble or bite the bait.

2. Magnets of Different Strengths Located on Opposite Sides of the Swinging Arm

Figure 7:
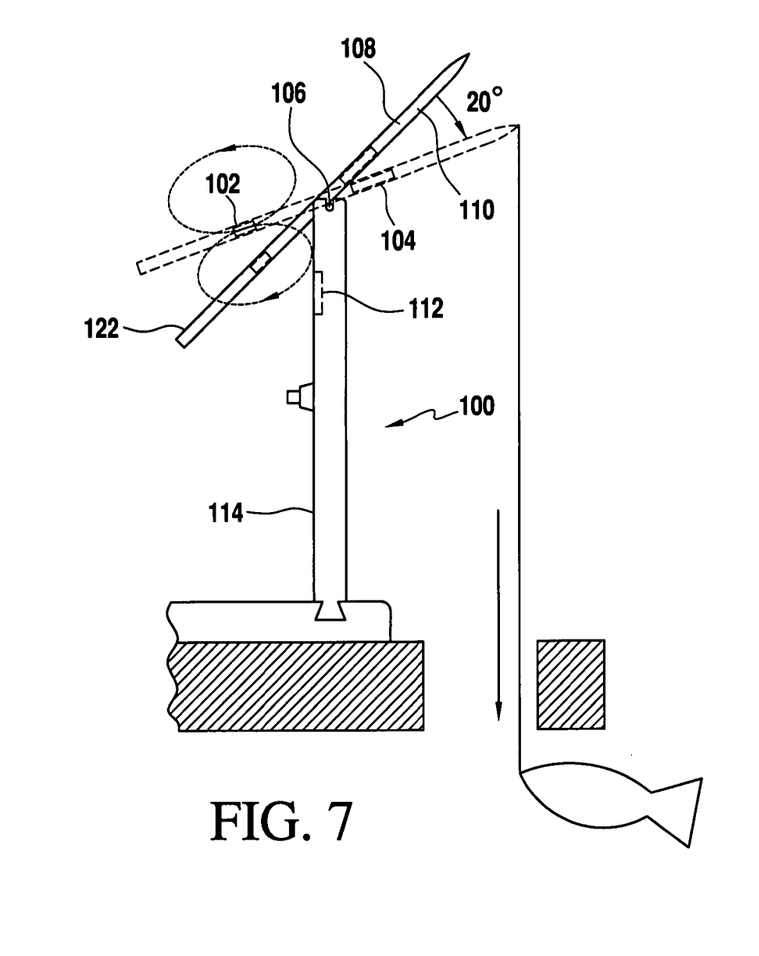
FIGS. 7-10 are elevations of a second embodiment of the tip-up of the invention.
Figure 8:
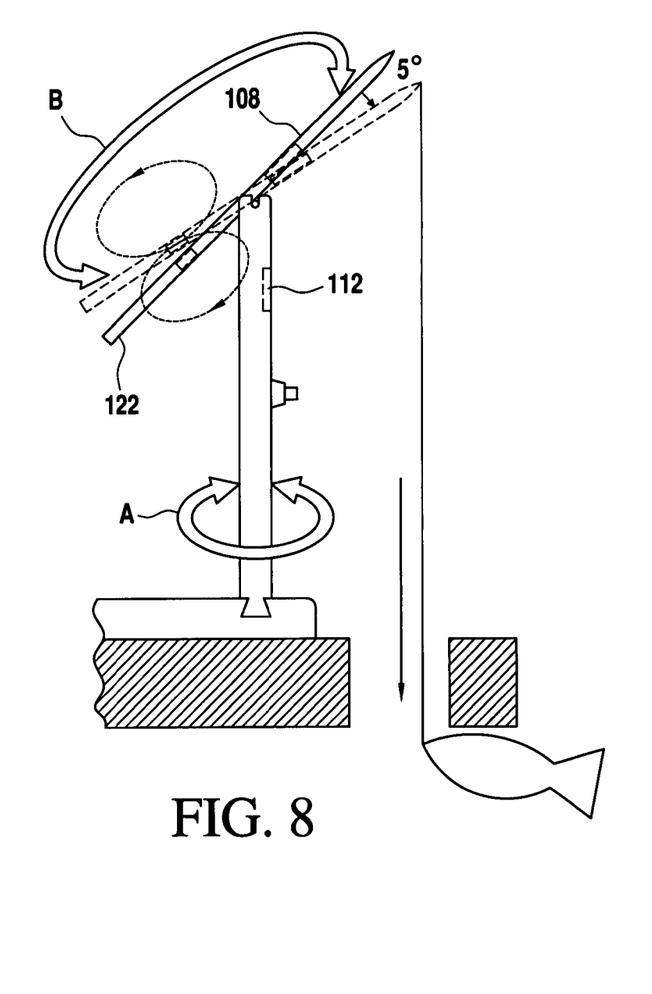

With reference to FIGS. 7 and 8, the illustrated tip-up, generally 100, has two magnets 102, 104 on opposite sides of the fulcrum 106 of its swinging arm 108. Magnet 104 is on the forward segment 110 of the arm and, being larger, than magnet 102, is the more powerful of the two magnets. The magnetic field of the weaker magnet 102 is shown in broken lines.

The armed position of the swinging arm 108a is shown shaded while the arm is in an activated or tripped position is in broken lines. Normally closed reed switch 112 is located on support 114 of the tip-up. In FIG. 7, the switch is located on the rear side of the support, i.e. the side opposite the forward end 116 of the swinging arm while in FIG. 8, the switch is located on the forward side of the support.

When the fish strikes line 120, the forward segment of the swinging arm swings down while the rear segment 122 swings up. When the rear segment has swung up from a lower position in which the magnetic field of magnet 102 is powerful enough to open the reed switch to an upper position in which the magnetic field is too week to continue to hold the switch open, and the switch closes and a signal is generated.

In FIG. 7, the reed switch is closer to magnet 102 than it is in FIG. 8. The arc of upward travel of the rear segment 122 of the swinging arm while the magnet affects the operation of the reed switch is accordingly greater in FIG. 7 than it is in FIG. 8. In FIG. 7 the arc is set at 20 degrees while in FIG. 8, support 114 has been rotated 180 degrees as indicated by arrow A so that the reed switch is on the opposite side of the support and the arc of travel is set at 5 degrees. These numbers are arbitrary and can be adjusted in a number of ways. One way is to substitute a magnet of increased or decreased strength for magnet 102. Another way is to slide the swinging arm along the fulcrum fo alter the spacing between magnet 102 and the reed switch.

Figure 9:
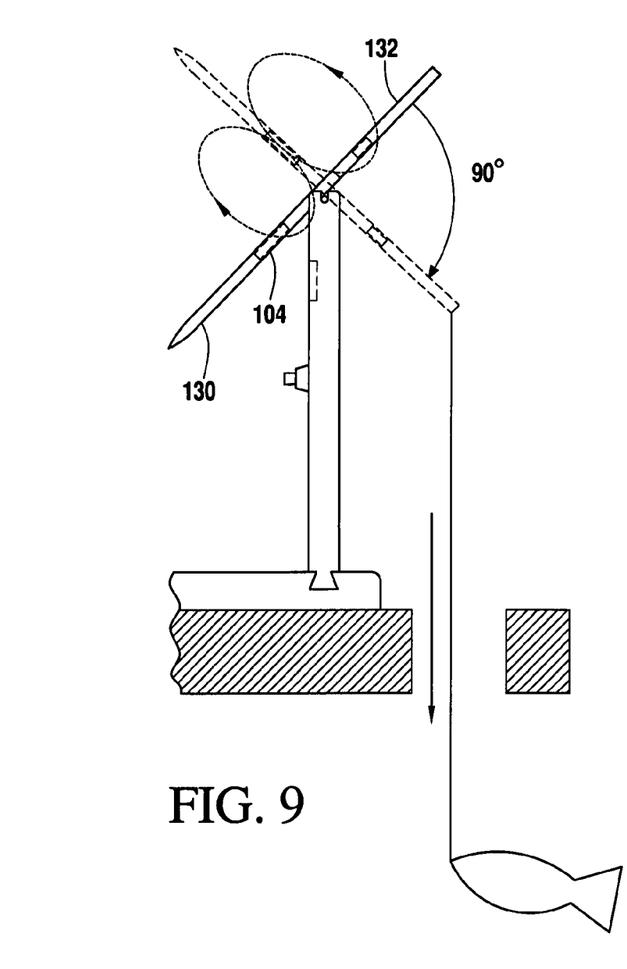
Figure 10:
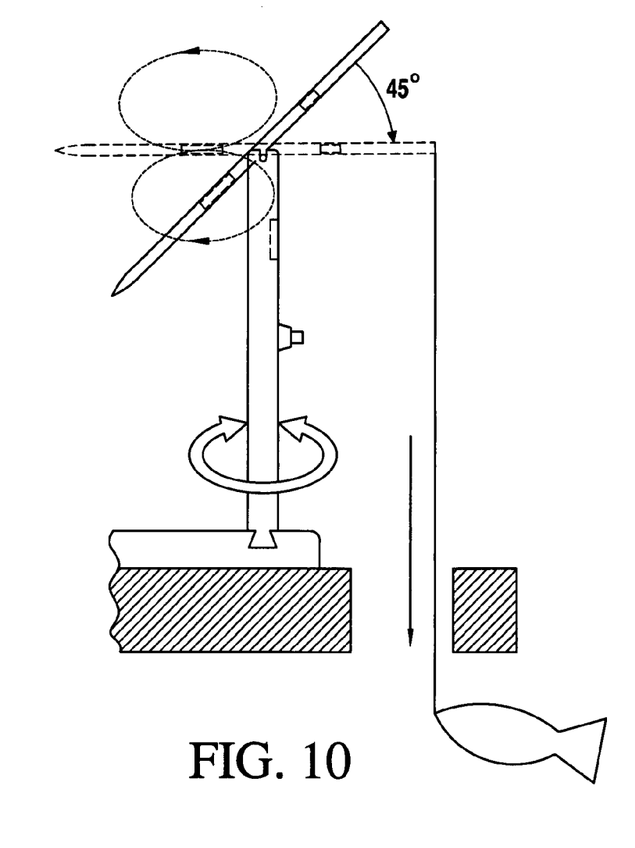

A still further way to alter the arc or angle of travel of the swinging arm is to rotate the swinging arm 180 degrees as indicated by arrow B in FIG. 8. FIGS. 9 and 10 illustrate the swinging arm in the altered position. In those Figures, the more powerful magnet 104 is now in the rear segment 130 (formerly forward segment 108) of the arm and the weaker magnet 102 is in what is now the forward segment 132 of the arm. The arc of upward travel of the swinging arm is now much greater, both when the reed switch 112 is located on the rear side of We support as in FIG. 9 or in the forward side of the support as in FIG. 10. The arcs are set at 90 degrees and 45 degrees but again these numbers arc arbitrary and are adjustable as explained above.

Adjustment of the position of the reed switch between the forward and rear positions on the support as described in the previous paragraph is possible to achieve by conventional means such as by a thumb screw which is threadably attached to the support and which, when its forward end bears against the reed switch, causes the switch to move toward one or the other of those two positions.

Figure 11:
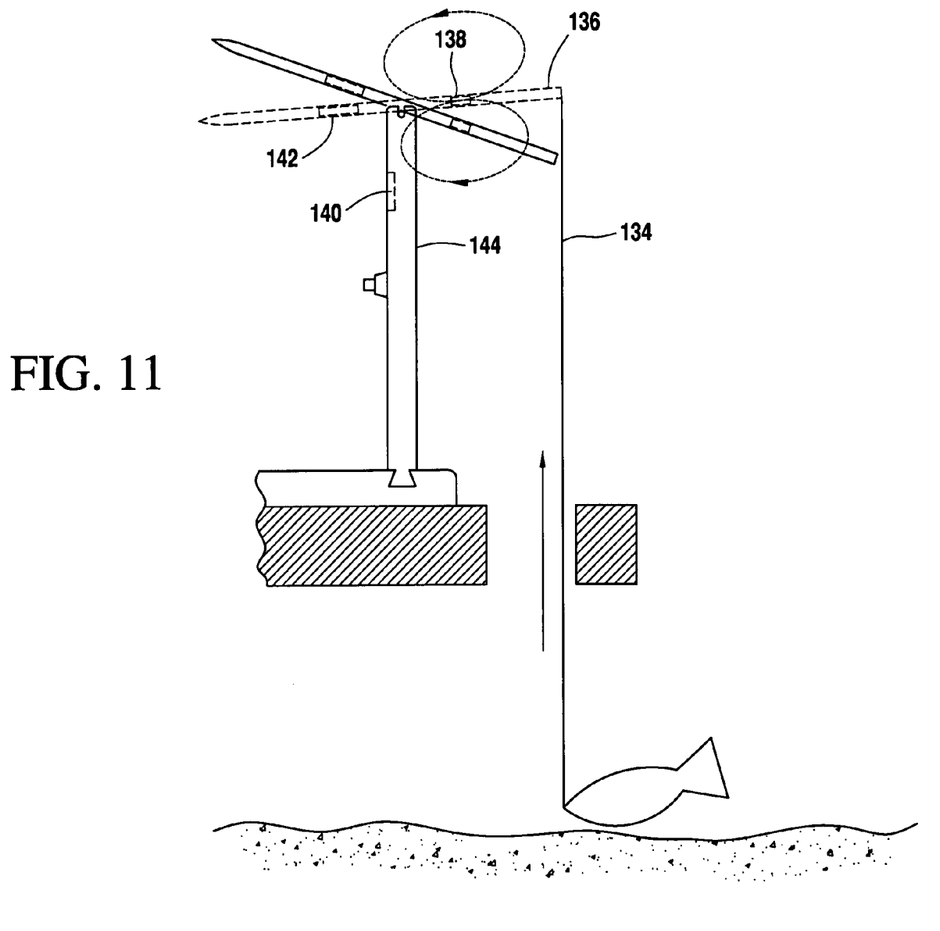
FIG. 11 is an elevation of the second embodiment of the tip-up used to catch a bottom feeding fish.

With reference to FIG. 11, the fish depicted is a bottom-feeding fish such as a whitefish while in the FIGS. 7-10 the fish is one which pulls on bait which is above the bottom of a body of water such as a walleye, pickerel, and trout. A bottom-feeding fish picks up bait from the bottom and accordingly causes a fishing line 134 to go slack. The forward segment 136 of the swinging arm weighs less than the rear segment since the latter segment caries the reel (not illustrated) so that when the fishing line goes slack, the forward segment rises As it does so the spacing between its magnet 138 and reed switch 140 increases. When the reed switch is no longer affected by the magnetic field of the magnet, the reed switch closes and a signal is activated.

As with the swinging arms of FIGS. 7 to 10, the swinging arm of FIG. 11 is provided with two magnets 138 and 142 of different magnetic strengths so that the arc of travel of the swinging arm is adjustable. Support 144 can also be rotated 180 degrees to adjust the length of the arc of travel of the swinging arm.

Figure 12:
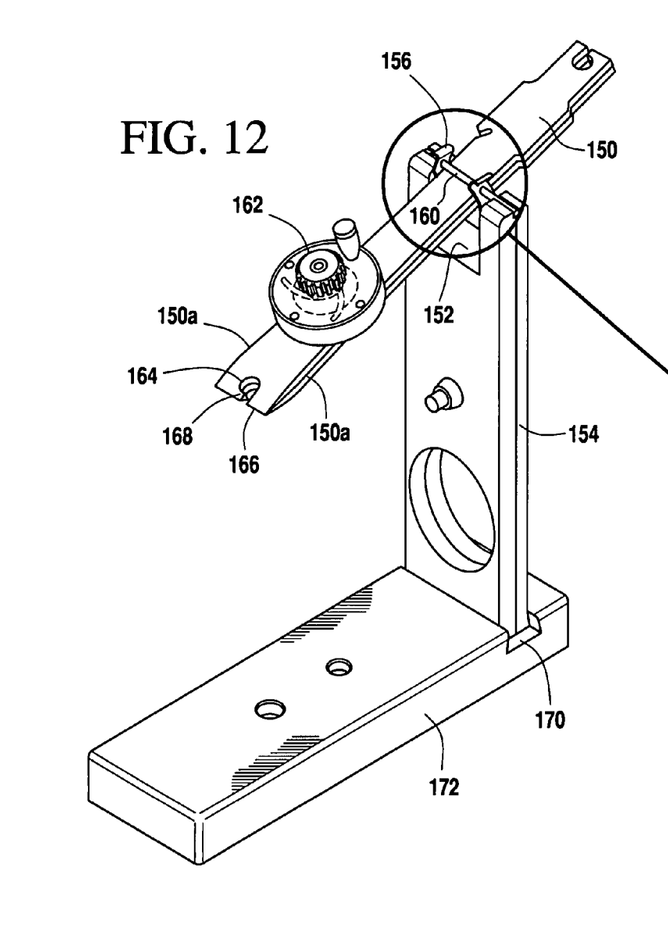
FIG. 12 is a perspective view of the second embodiment of the tip up.
Figure 13:
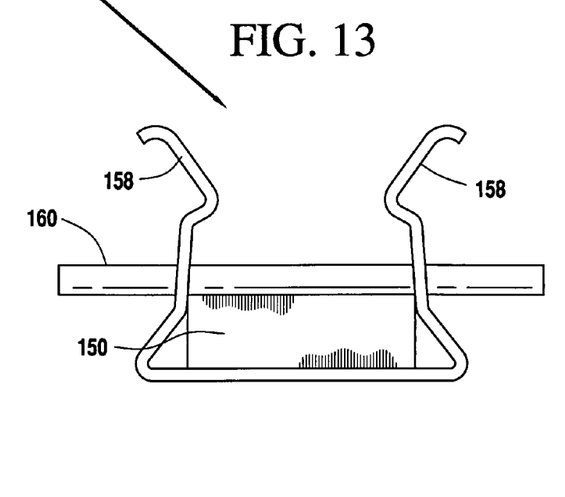
FIG. 13 is an enlarged elevation of a clip used to attached a swinging arm of the tip-up to a vertical support.

With reference to FIGS. 12 and 13, the swinging arm 150 extends through a groove 152 at the top of support 154 and is pivotally attached to the support by means of a clip 156 which is removably received in the groove. The clip has a pair of spring-loaded flanges 158 separated by a space within which the arm is received. The flanges resiliently engage opposite facing side walls 150a of the arm for immobilizing the arm relative to the support until the flanges are forced apart to enlarge the space so that the arm can be slid along the clip. A rod 160 extends through openings in the clip for preventing The arm from separating from the clip.

A reel 162 is attached to the swinging arm and provision is made for permitting its position to be adjusted in the manner described above.

Openings 164 arc formed adjacent to the terminal edge 166 at each end of the swinging arm 150 for receipt of the fishing line. A lip 168 is formed in each opening adjacent to the terminal edge to reduce the size of the entrance of the opening to minimize the possibility that the fishing line will slip out of the opening when a fish strikes the bait at the end of the line.

With reference again to FIG. 12, the support 154 for the tip-up is held upright in a groove 170 in a stand 172 which is intended to rest on the ice adjacent to the hole through which the fishing line extends. The support can be removed from the groove by sliding it to a side edge of the stand and rotated 180 degrees in order to vary the spacing between the reed switch and the magnet as is explained above.

Figures 14, 15:
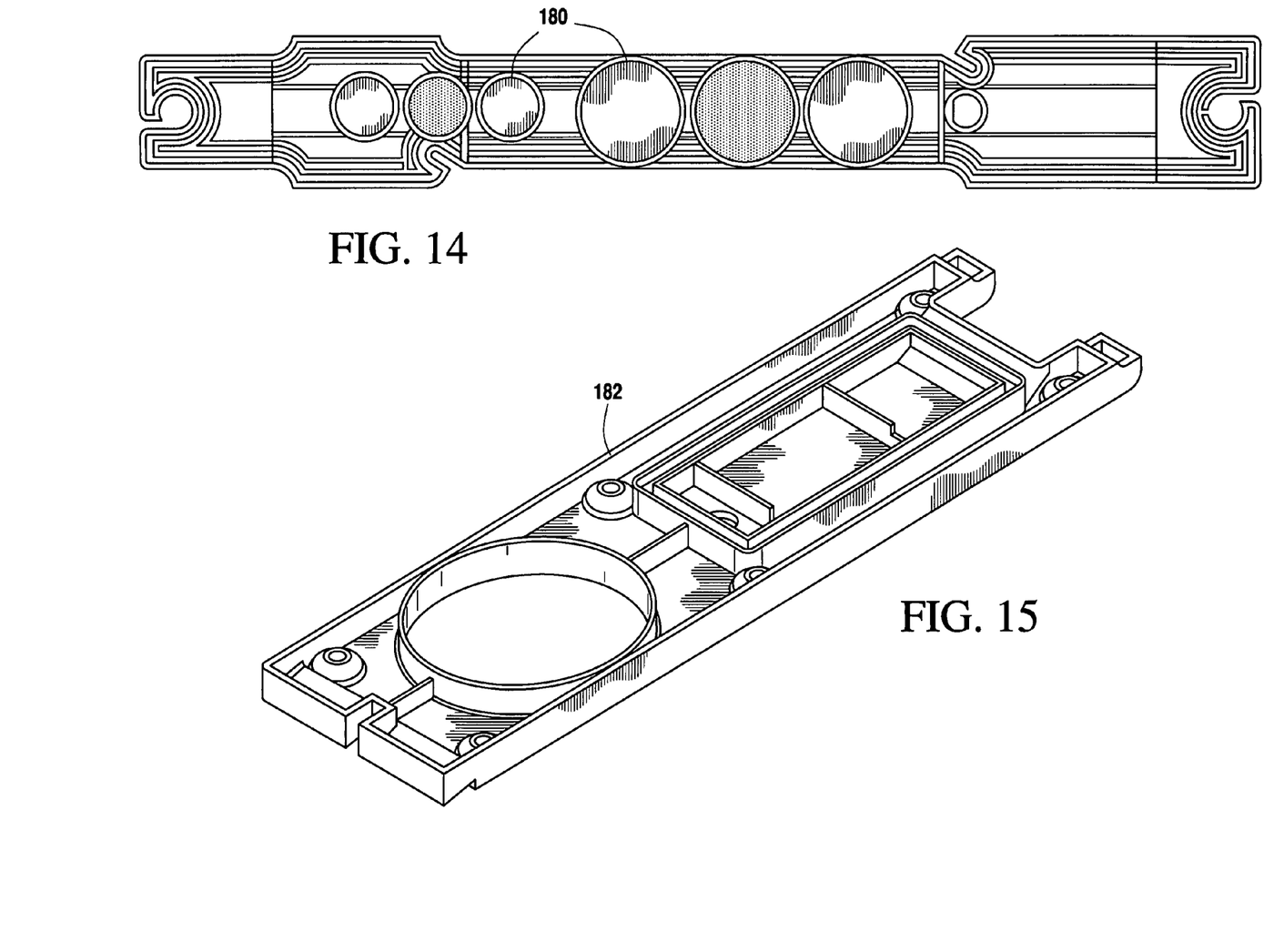
FIG. 14 is a plan view of the swinging arm having a number of circular depressions for placement of magnets at various locations along the arm.
FIG. 15 is a perspective view of the support having depressions in which other components of the tip-up can be stored when the tip-up is not in use.

With reference to FIG. 14, circular depressions 180 are formed in the wall of the swinging arm for receipt of magnets. The radii of the depressions vary to receive various sizes of magnets. FIG. 15 illustrates the configuration of support 182 in which the other components of the tip-up can be stored in the illustrated hollow depressions in the support. Such a support is useful for storage and transport of the components of the tip-up when collapsed.

It will be understood, of course, that modifications can be made in the structure and components of the various embodiments of the fishing tip-up of the invention without departing from the scope and purview of the invention as defined in the appended claims. For example, an audible signal such as a buzzer or horn can be substituted for lights 28 or used in conjunction with the lights. In addition, in the embodiment illustrated in FIGS. 1-6, the electrical circuit 61 can be located in the swinging arm and magnet 70 can be located in the upright support.

I claim:

1. A fishing tip-up comprising: a signal, an upright support; a swinging arm having first and second segments each of which terminates at a terminal edge at opposite ends of said arm, said arm being pivotal relative to said support such that when one of said segments pivots downward the other of said segments pivots upward, said arm being adapted to support a fishing line which extends downward selectively from either one of said terminal edges and to which a bait is attached for attracting a fish, whichever said segment from which said fishing line extends pivoting downward when said fishing line is subject to a downward force greater than a predetermined value; a normally closed magnetically opened switch provided in said support; and a magnet provided in each of said first and second segments for opening said switch, said magnets being of unequal magnetic strength and a selective one of which being normally proximate sufficiently close to said switch to cause said switch to remain open until said force of predetermined value causes said swinging arm to pivot with resulting separation of said proximate magnet from said switch with resulting closure of said switch and concurrent activation of said signal, further including positioning means for selectively positioning said arm on said support in two separate positions separated 180 degrees from each other, whereby one of said magnets of unequal magnetic strength may be selected to be proximate to said switch to maintain said switch in an open position with varied sensitivity, and a stand for immobilizing said support upright, said support being removably attached to said stand and rotatable between two separate positions separated 180 degrees from each other.

2. The fishing tip-up of claim 1 further including adjustment means associated with said switch for adjusting the space between said switch and said proximate magnet.

3. The fishing tip-up of claim 2 wherein said adjustment means is a thumb screw.

4. The fishing tip-up of claim 1 wherein said positioning means is a clip removably disposed on a groove formed in an upper wall of said support, said clip having a pair of spring loaded flanges separated by a space within which said arm is disposed, said flanges resiliently engaging opposite facing side walls of said arm for immobilizing said arm relative to said support until a force, opposed to the bias of said flanges, is applied to enlarge said space to allow said arm to slide along said clip.

5. A fishing tip-up comprising: a signal, an upright support; a swinging arm having first and second segments each of which terminates at a terminal edge at opposite ends of said arm, said arm being pivotal relative to said support such that when one of said segments pivots downward the other of said segments pivots upward, said arm being adapted to support a fishing line which extends downward selectively from either one of said terminal edges and to which a bait is attached for attracting a fish, whichever said segment from which said fishing line extends pivoting upward when said bait is elevated by a fish; a normally closed magnetically opened switch provided in said support; and a magnet provided in each of said first and second segments for opening said switch, said magnets being of unequal magnetic strength and a selective one of which being normally proximate sufficiently close to said switch to cause said switch to remain open until said segment from which said fishing line extends pivots upward with resulting separation of said proximate magnet from said switch with resulting closure of said switch and concurrent activation of said signal, further including positioning means for selectively positioning said arm on said support in two separate positions separated 180 degrees from each other, whereby one of said magnets of unequal magnetic strength may be selected to be proximate to said switch to maintain said switch in an open position with varied sensitivity, and a stand for immobilizing said support upright, said support being removably attached to said stand and rotatable between two separate positions separated 180 degrees from each other.

6. The fishing tip-up of claim 5 further including adjustment means associated with said switch for adjusting the space between said switch and said proximate magnet.

7. The fishing tip-up of claim 6 wherein said adjustment means is a thumb screw.

8. The fishing tip-up of claim 5 wherein said positioning means is a clip removably disposed on a groove formed in an upper wall of said support, said clip having a pair of spring loaded flanges separated by a space within which said arm is disposed, said flanges resiliently engaging opposite facing side walls of said arm for immobilizing said arm relative to said support until a force, opposed to the bias of said flanges, is applied to enlarge said space to allow said arm to slide along said clip.

* * * * *